United States Patent
Mizutani

(10) Patent No.: US 7,233,697 B2
(45) Date of Patent: Jun. 19, 2007

(54) CHARACTER RECOGNITION DEVICE AND A METHOD THEREFOR

(75) Inventor: Hiroyuki Mizutani, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 722 days.

(21) Appl. No.: 10/108,625

(22) Filed: Mar. 29, 2002

(65) Prior Publication Data

US 2002/0154815 A1 Oct. 24, 2002

(30) Foreign Application Priority Data

Mar. 30, 2001 (JP) ............................ 2001-100534

(51) Int. Cl.
*G06K 9/00* (2006.01)
*G06K 9/18* (2006.01)
*G06K 9/34* (2006.01)
*G06K 9/46* (2006.01)
*G06K 9/66* (2006.01)

(52) U.S. Cl. .................. 382/182; 382/138; 382/177; 382/178; 382/179; 382/190

(58) Field of Classification Search ........ 382/100–102, 382/135–140, 164, 177–185, 226–228, 190
See application file for complete search history.

(56) References Cited

U.S. PATENT DOCUMENTS 5,689,585 A * 11/1997 Bloomberg et al. ......... 382/229
5,881,172 A * 3/1999 Pintsov ....................... 382/227
6,330,358 B1 * 12/2001 Nagaishi ..................... 382/178
6,738,519 B1 * 5/2004 Nishiwaki ................... 382/228
6,826,305 B2 * 11/2004 Zhu ............................ 382/172
6,834,121 B2 * 12/2004 Guillevic et al. ........... 382/224

FOREIGN PATENT DOCUMENTS

| JP | 8-212301 | 8/1996 |
|---|---|---|
| JP | 9-54813 | 2/1997 |
| JP | 2000-339408 | 12/2000 |
| JP | 2000339408 A * | 12/2000 |

* cited by examiner

*Primary Examiner*—Matthew C. Bella
*Assistant Examiner*—Yubin Hung
(74) *Attorney, Agent, or Firm*—Finnegan, Henderson, Farabow, Garrett & Garrett, L.L.P.

(57) ABSTRACT

The present invention relates to an optical character recognition device (OCR) for reading a form provided with character frames in reading fields, into which a user fills each character. Characteristic vectors are extracted from the character images of each frame. A number of characters decision unit 16, into which the characteristic vectors are input, decides the number of characters filled in one of the character frames. A character separation unit 18 separates each of characters from the character image based on the number of characters decided by the decision unit 16. The character recognition unit 20 then recognizes each of the character. The OCR according o the present invention is able to read the form correctly, in which a plurality of characters are filled in one of the frames.

18 Claims, 4 Drawing Sheets

CHARACTER RECOGNITION DEVICE AND A METHOD THEREFOR

This application claims benefit of priority to Japanese Application No. 2001-100534, filed on Mar. 30, 2001.

BACKGROUND OF THE INVENTION

Field of the Invention

The present invention relates to a device and method for recognizing characters filled in a blank form (hereinafter referred to as a form).

An optical character recognition device (hereinafter called as an OCR) reads characters filled in the various forms including a dropout color form used solely for inputting characters. For reading the characters with a high efficiency, it is widely adapted to provide character frames, in which users are requested to fill the characters.

An algorithm for operating the OCR to read the form assumes only two cases, where no character is filled in each character frame and where one-character is filled in.

Therefore, when two or more characters are filled in one-character frame, the OCR is designed so as to refuse reading the form on the assumption that the specification of the form to be read does not meet with a predetermined specification, making the correct reading impossible in principle.

A method for estimating a number of characters in each frame disclosed in, for example, Japanese Patent Application 8-212301 using information of character pitch or strokes or in Japanese Patent Application 2000-339408 is not applicable to a case, where a plurality of characters are filled in one-character frame.

As described above, the conventional OCR cannot recognize the characters correctly judging the form to be out of the specification, when two or more characters are filled in one-character frame, because the recognition algorithm is designed on the assumption that the form is used, in which a character frame is provided for each character.

SUMMARY OF THE INVENTION

The present invention is intended to provide a character recognition device and a method therefor capable of correctly recognizing even when pluralities of characters are filled in each character frame.

To solve the problem and accomplish the object described above, the present invention adopts the means indicated below.

(1) A character recognition device for recognizing characters filled in a form provided with character frames has a means for deciding a number of characters filled in each character frame and a means for separating and recognizing characters from character images in the character frame by separating each character of the number decided by the decision means.

Further, in the character recognition device according to the present invention, the decision means of a number of characters has a means for obtaining a characteristic vector of the character image in the character frame and a means for deciding a number of characters using a discriminant function of a number of characters provided with the characteristic vector as an input and the recognition means recognizes characters using the characteristic vector.

Furthermore, in the character recognition device according to the present invention, the discriminant function of a number of characters is an n-character discriminant function providing a first function value when the number of characters filled in one of the character frame is n (n is an arbitrary integer) and a second function value when the number of characters filled in the character frames is not n.

Furthermore, in the character recognition device according to the present invention, the decision means has a means for obtaining a distribution of characteristic vectors of the character image when the number of characters filled in one of the character frames is n (n is an arbitrary integer), a means for obtaining a distribution of the characteristic vectors of the character image when the number of characters filled in the one-character frame is not n, a means for inputting the characteristic vectors of the character image filled in one of the character frames, and a means for deciding whether the number of characters of the characteristic vectors of the input character image is n or not based on the distance between the distribution of the characteristic vectors input by the input means and the distribution of the characteristic vectors obtained by the above means.

(2) A character recognition method for recognizing characters filled in a form provided with character frames are provided includes steps of inputting a character image of the form, obtaining characteristic vectors of the character image in one of the character frames, deciding the number of characters in the character frame based on the characteristic vectors, separating each character image from the character image in the character frame based on the decided number of the characters, and recognizing the separated characters using the characteristic vectors.

More specifically, the method according to the present invention is a method for recognizing characters filled in a form provided with character frames having steps of inputting image information of the form, in which at least a character is filled in each character frame, obtaining characteristic vectors of the character image in one of the character frames using the input image information of the form, deciding the number of characters in the character frame based on the characteristic vectors obtained, separating the characters one by one from the character image in the character frame based on the number of characters decided, and recognizing the characters separated using the characteristic vectors.

Further, in the character recognition method according to the present invention, the step of deciding the number of characters include a one-character decision step, which decides whether the number of characters filled in one of the character frames is one or more than one.

Furthermore, in the character recognition method according to the present invention, the one-character decision step has a step of obtaining a distribution of characteristic vectors extracted from a plurality of character images of one-character filled in one of the character frames, obtaining a distribution of characteristic vectors extracted from a plurality of character images of two or more than two-characters filled in one of the character frames, inputting characteristic vectors of a character image filled in one of the character frames, the number of characters of which is not known, and deciding whether the number of characters of the input characteristic vectors is one or not based on the distance between the distribution of the input characteristic vectors and the distribution of the characteristic vectors obtained by the step described.

(3) A character recognition program for recognizing characters filled in a form provided with character frames realizes a function for deciding a number of characters filled in one of the character frames and for separating and recognizing the characters, the number of which is decided by the decision means, from the character image of the character frame by using a computer.

DETAILED DESCRIPTION OF THE PREFERRED EMBODIMENTS

The preferred embodiments of the character recognition device and method according to the present invention will be explained hereunder with reference to the accompanying drawings.

Figure 1:
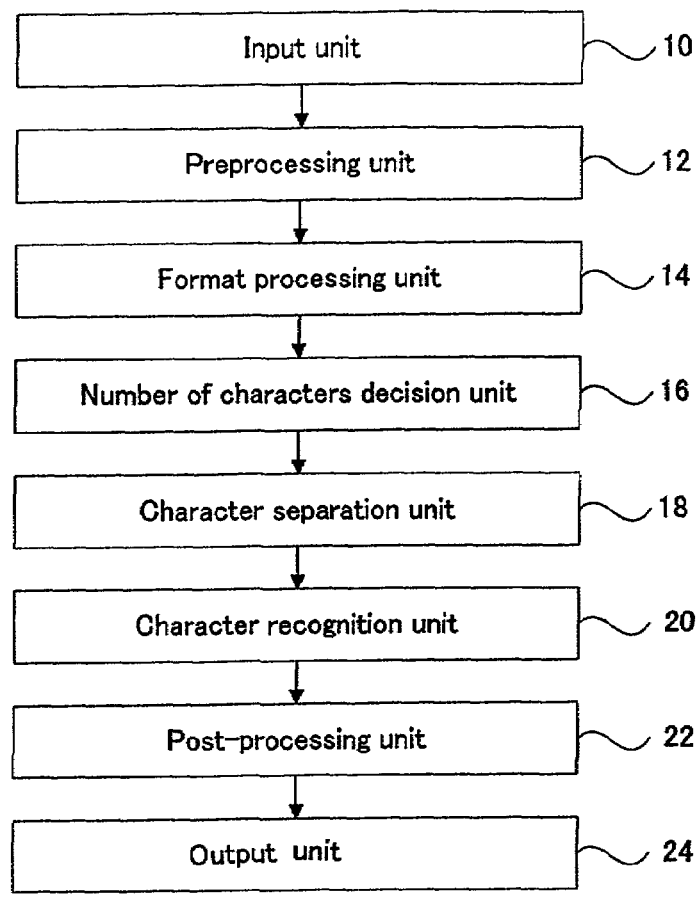
FIG. 1 is a block diagram showing a character recognition device relating to a first embodiment of the present invention.

FIG. 1 is a block diagram showing a character recognition device according to an embodiment of the present invention.

An input unit 10 is composed of a scanner or a digital camera, which converts an image of characters filled in a form into an electronic signal and obtains a character image.

A preprocessing unit 12 performs an image processing such as binarization, edge detection, noise removal, and label image generation for a character image input by the input unit 10.

A format-processing unit 14 analyzes the form format for a character image processed by the preprocessing unit 12 and decides the position of the reading field of the form in which character frames are formed. When the position of the reading filed is decided, a number of characters decision unit 16 decides the number of characters in the character frames of the reading field and a character separation unit 18 separates each character in the character image based on information indicating the number of characters decided. Various kinds of separating methods are available such as a method using a rectangle circumscribing the connected part of black pixels or a method for separating characters using projection.

A character image of each character output from the character separation unit 18 is supplied to a character recognition unit 20, where characteristic vectors of the character images are extracted. The character recognition unit 20 compares the characteristic vectors supplied with a characteristic vector of each character filed in a dictionary (not shown in the drawing) prepared in the character recognition unit 20 beforehand and decides candidate characters (character recognition). Here, the character frame is divided into 10×10 pixels, for example, and a shade pattern of the pixels is assumed as a characteristic vector in a 10×10 dimensional coordinate space, and the inner product with a character vector as dictionary data defined in a similar space is obtained, to recognize what character it is. A post-processing unit 22 edits and corrects the character recognition results. An output unit 24 executes format conversion and data conversion of the recognition results depending on output media.

Figure 2:
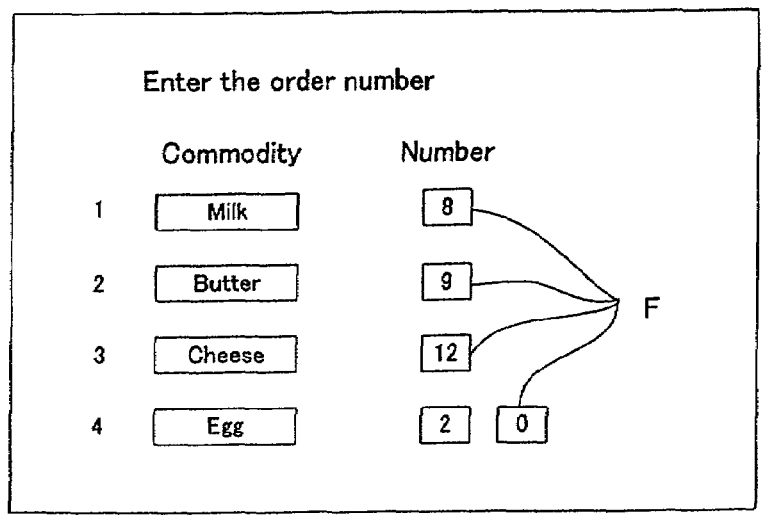
FIG. 2 is a drawing showing an example of a form to be recognized by the character recognition device according to the present invention.

FIG. 2 shows an example of a form to be read by the character recognition device shown in FIG. 1. The example is an order form of commodities used for mail-order business, in which a character frame F for filling a figure is provided after each commodity name, and the form is designed so as to fill one-character (one figure) in each character frame F. However, in the item of the third commodity name "Cheese", two-characters such as "12" are filled in the single character frame F, which does not meet the specification of this kind of form. However, in the embodiment according to the present invention, a form, in which more than two-characters are filled in one-character frame F as shown can be recognized. To realize it, the number of characters decision unit 16 is provided at an antecedent part to the character separation means 18 in the embodiment of the present invention, as shown in FIG. 1. The number of characters decision unit 16 judges how many characters are filled in each character frame F, the result of which is used for separating each character from the character frame F. The characters thus separated are recognized, even if two-characters, for example, are filled in a single character frame. The signal representing each of two-characters recognized is output instead of a signal representing an impossible reading.

Figure 3:
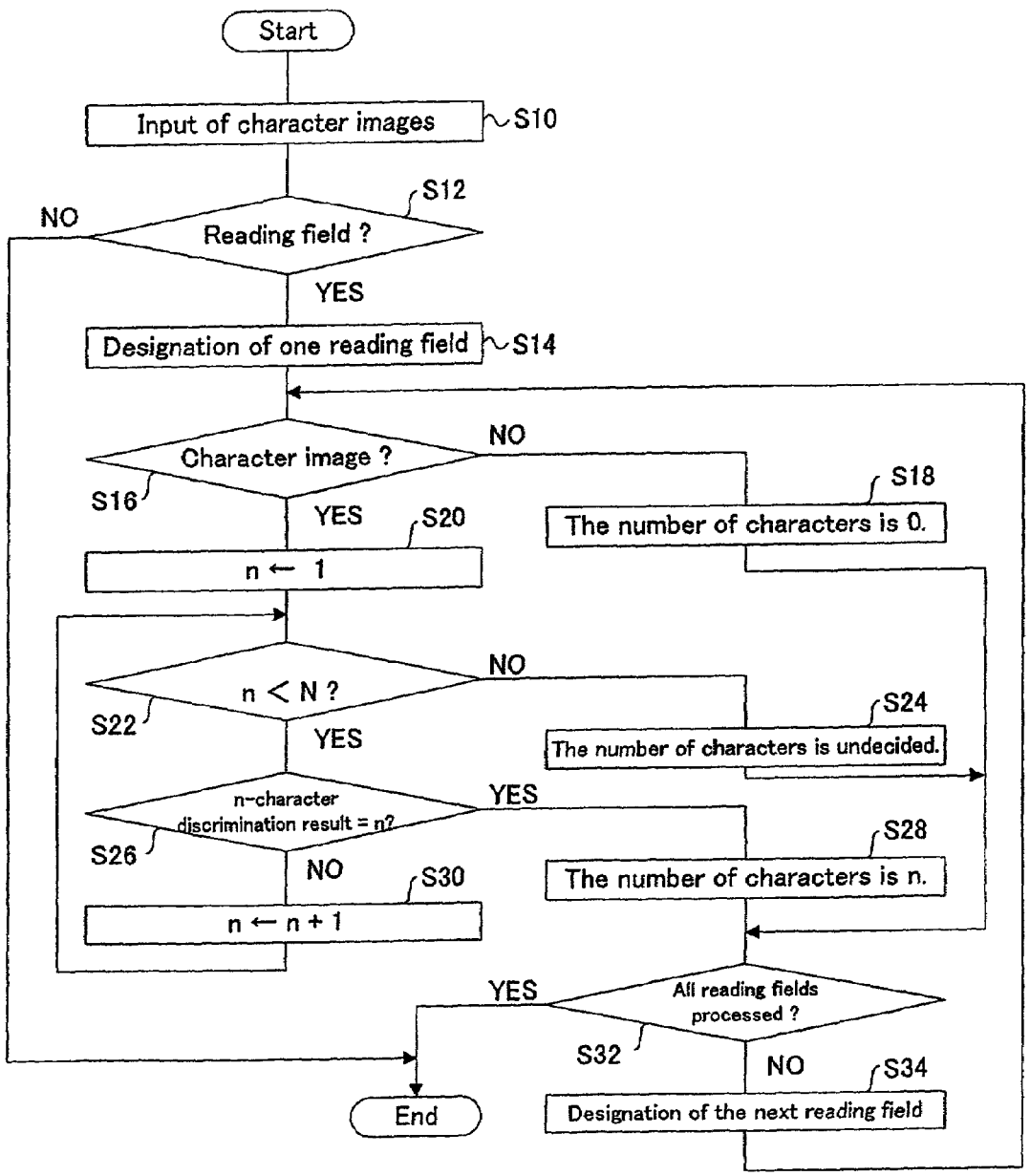
FIG. 3 is a flow chart showing an operation of the character recognition device shown in FIG. 1.

FIG. 3 is a flow chart showing an operation of the number of characters decision unit 16. When a character image is input (Step S10) after the preprocessing and the format processing are applied, it is judged at Step S12 whether there is a reading field in the character image or not. When there is no reading field (NO of Step S12), the processing ends. When there is a reading field (YES of Step S12), one of the character frames F is designated at Step S14 and it is judged whether there is a character image in the character frame F or not at Step S16. When there is no character image in the character frame (NO of Step S16), it is decided that the number of characters is zero (this means no figure is filled) at Step S18 and it is decided whether the process ends for all the reading fields or not at Step S32. When the process ends for all the reading fields, the processing ends. When unprocessed reading fields still remain, the next reading field is designated at Step S34 and the process deciding whether there is a character image in the character frame of the reading field or not is repeated at Step S16.

When it is decided that there is a character image in the character frame F of the reading field at Step S16, a variable n indicating an assumed number of the characters is set to 1 at Step S20. It is decided whether the variable n is less than an upper limit value N or not at Step S22. When the variable n reaches the upper limit value N (NO of Step S22), the number of characters is not decided (decision impossible) at Step S24, and the process goes to Step S32, where it is decided whether the process ends for all the reading fields in a similar manner as described above.

When the variable n is less than the upper limit value N (YES of Step S22), the number of characters in the character frame of the reading field is assumed as n at Step S26 and it is decided whether this assumption is correct or not. Although various methods are available for making the decision, it is decided here whether the assumption is correct or not depending on whether the functional value is larger than the threshold value or not, using a n-character discriminant function, which is a function of a characteristic vector extracted from the character image, as described in detail later with reference to FIG. 4. When the assumption that the number of characters is n is judged to be proper (YES of Step S26), the number of characters is decided as n at Step S28, and the process goes to Step S32, where it is also decided whether the process ends for all the reading fields.

When the assumption that the number of characters is n is judged to be not proper (NO of Step S26), the number n is incremented by 1 at Step S30 and the process is returned to Step S22. Namely, the routine of Steps S22, S26, S28, and S30 is executed repeatedly up to the upper limit value N and the number of the characters is decided at Steps S26 and S28.

In the embodiment described above, when there is a character image in the character frame of the reading field, the number of characters is decided sequentially using a one-character discriminant function, a two-character discriminant function, - - -, and an (N−1)-character discriminant function. When the number of characters cannot be decided even by using the (N−1)-character discriminant function, it is judged that the number of characters is not decided.

Figure 4:
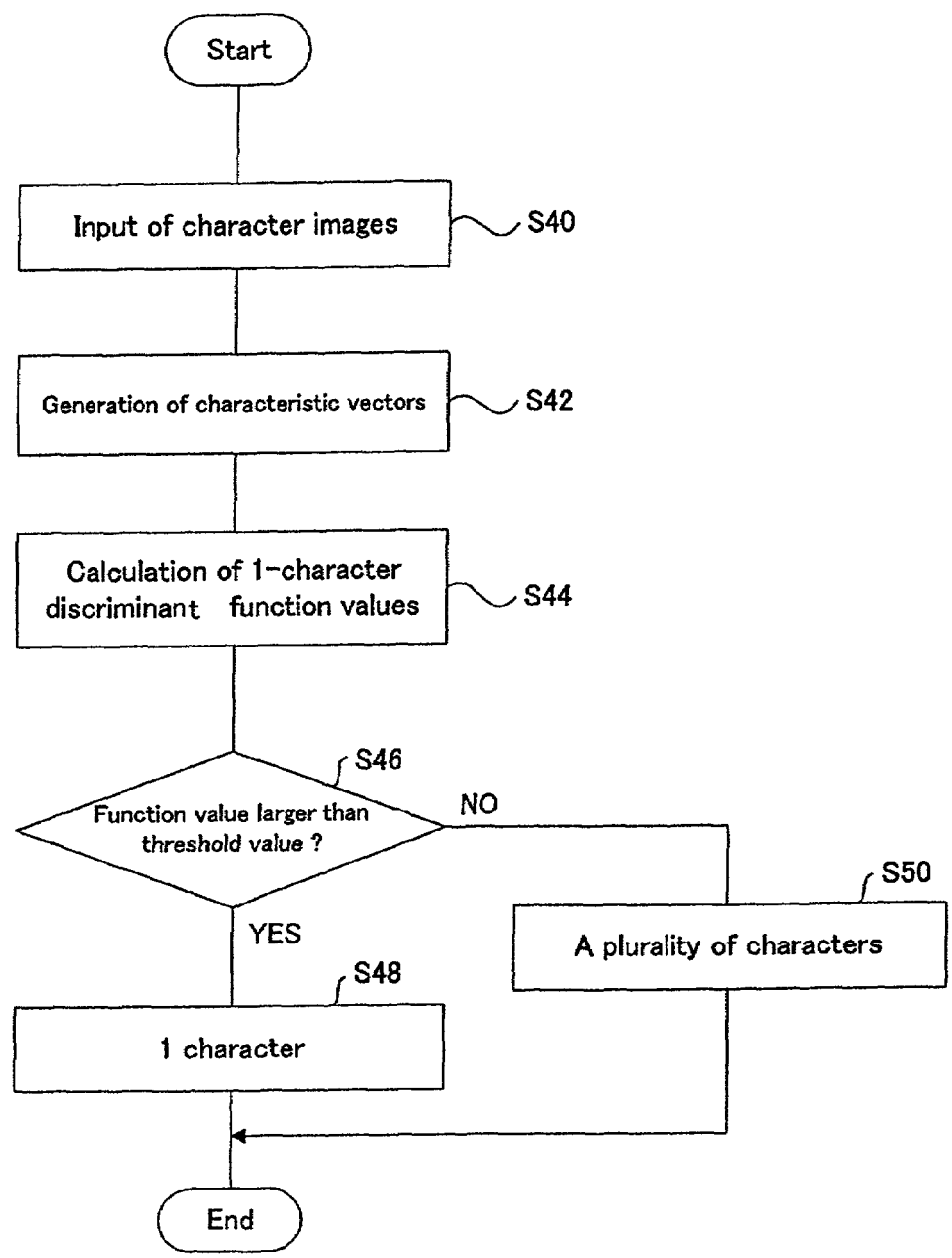
FIG. 4 is a flow chart showing an operation for deciding the number of characters in the character recognition device shown in FIG. 1.

In the next, the discrimination (Step S26 shown in FIG. 3) using an n-character discriminant function will be explained. FIG. 4 is a flow chart showing the discriminant operation at the time when n=1 using the one-character discriminant function for deciding whether the number of characters is one or not (a plurality of characters).

When the character image in the character frame F of the reading field is input after the preprocessing and format processing are completed (Step S40), the character characteristic is extracted from the character image by a predetermined characteristic extraction algorithm at Step S42 and a characteristic vector is generated. The value of the one-character discriminant function is calculated by inputting the characteristic vector thereto at Step S44. At Step S46, it is decided whether this functional value is larger than a predetermined threshold value or not. When the functional value is larger than the threshold value, it is judged that the assumption of a number of characters as one is proper at Step S48. On the other hand, when the functional value is not larger than the threshold value, the assumption is not correct, so that the number of characters is judged as plural. With respect to the comparison of the functional value with the threshold value according to the embodiment, the assumption of n characters is correct when the functional value is larger than the threshold value, whereas the assumption is not correct when the functional value is not larger than the threshold value. However, the relation between the functional value and the threshold value can be interchanged depending on the definition of the discriminant function.

In a case of the n-character discriminant function, it is decided in a same way that the number of characters is n when the functional value is larger than the threshold value, whereas it is decided that the number of characters is not n but n+1 or more, when the functional value is not larger than the threshold value.

In the next, a method for generating the n-character discriminant function will be explained. As an example, a case of n=1 will be explained first. A large number of samples of the character image are prepared, in which one-character is filled in a single character frame in the reading field. A large number of samples of the character image are prepared, in which two or more characters are filled in each character frame. For example, when the characters to be recognized are numerals from 0 to 9, 10 characters indicating any one of 0 to 9 are prepared as the samples of the character image of a single character. On the other hand, for the samples of the character image, in which two or more characters are filled in the single frame, a hundred samples composed of permutations of two-characters out of ten numerals from 0 to 9, such as 00 to 99; a thousand samples composed of permutations of three characters out of ten numerals from 0 to 9, such as 000 to 999; ten thousand samples composed of permutations of four characters out of ten numerals from 0 to 9, such as 0000 to 9999, and $10^N$ samples composed of permutations of N characters out of 10 numerals from 0 to 9 are prepared respectively.

Figure 5:
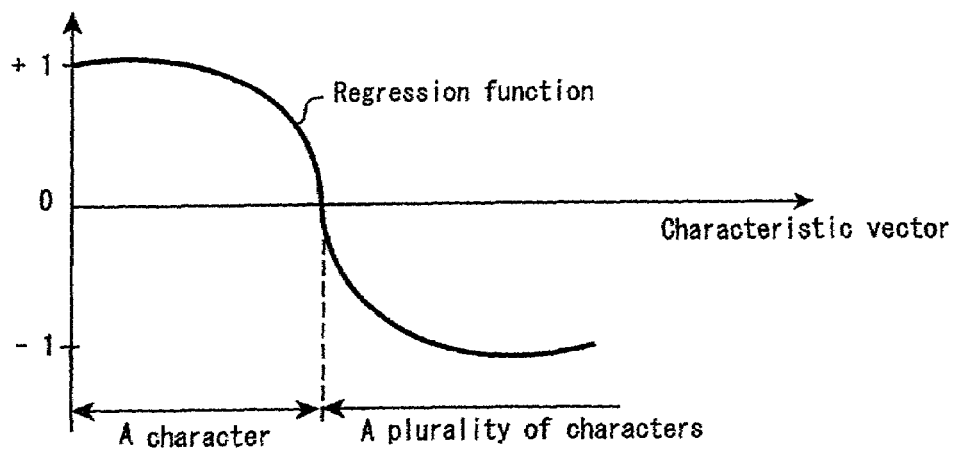
FIG. 5 is a drawing showing an example of a discriminant function of the number of characters using a regression function according to the present invention.

Characteristic vectors of the respective frames are extracted from these character image samples, using the same characteristic extraction algorithm as that used in the number of characters decision unit 16. A sign is given to the characteristic vectors of the respective frames, depending on whether the number of the character is one or more than one. For example, a sign of +1 is given to the characteristic vectors in a case of one and a sign of −1 is given to the characteristic vectors in a case of more than one. In this way, a one-character discriminant function can be obtained, which is provided with the characteristic vectors of all the samples as its input and provide the signs as its output. The one-character discriminant function is expressed by a regression curve, as shown in FIG. 5, which is obtained by the least squares method or the regression analysis on coordinates, where the axis of abscissa indicates characteristic vectors and the axis of ordinate indicates signs of +1 and −1. In the discriminant function shown in FIG. 5, where the threshold value is set to 0, the character image is judged to be composed of one-character if the value of the discriminant function is positive, and the character image is judged to be composed of two or more characters if it is negative.

In the above example, the constitution method of the n-character discriminant function for use when n=1 is explained. However, also in a case of n>1, the discriminant function can be structured in the same way. For example, when n=2, the two-character discriminant function is used for deciding whether the number of characters filled in one of the frames is two or more than two. This function is prepared as stated below. Firstly, a large number of character image samples are prepared, in which two-characters are filled in the single character frame in the reading field. A large number of character image samples are also prepared, in which three or more characters are filled in the single character frame in the reading field. Namely, when the characters to be recognized are numerals of 0 to 9, 100 samples composed of permutations of two-characters out of ten numerals from 0 to 9, such as 00 to 99 are prepared for the character image samples of two-characters. On the other hand, for the samples of the character images, in which three or more characters are filled in the single frame, a thousand samples composed of permutations of three characters out of ten numerals from 0 to 9, such as 000 to 999; ten thousand samples composed of permutations of four characters out of ten numerals from 0 to 9, such as 0000 to 9999; and $10^N$ samples composed of permutations of N characters out of 10 numerals from 0 to 9 are prepared respectively.

Characteristic vectors of the respective frames are extracted from these character image samples, using the same characteristic extraction algorithm as that used in the number of characters decision unit 16 in the same way described. A sign is given to the characteristic vectors of the respective frames, depending on whether the number of the character is two or more than two. For example, a sign of +1 is given to the characteristic vectors in a case of two-characters, and a sign of −1 is given to the characteristic vectors in a case of three or more characters. In this way, two-character discriminant function can be obtained, which is provided with the characteristic vectors of all the samples as its input and provide the signs as its output. Thus the two-character discriminant function is obtained, which is composed of a regression curve and the sign of which varies between +1 and −1 depending on the input vector, in the same way as the case of one-character discriminant function shown in FIG. 5.

The three-character discriminant function for use when n=3 can be obtained in the same way. This function decides whether the number of characters filled in a single frame is three or more than three. For preparation of the function, a large number of character image samples are prepared, in which three characters are filled in a single character frame and in which four or more characters are filled in a single character frame. Namely, for the character images, in which three characters are filled, 1000 samples composed of permutations of three characters out of ten numerals from 0 to 9, such as 000 to 999. On the other hand, for the character images, in which four or more characters are filled, ten thousand samples composed of permutations of four characters out of ten numerals from 0 to 9, such as 0000 to 9999 and $10^N$ samples composed of permutations of N characters out of ten numerals from 0 to 9 are prepared.

Characteristic vectors of the respective frames are extracted from these character image samples, using the same characteristic extraction algorithm as that used in the number of characters decision unit 16. A sign is given to the characteristic vectors of the respective frames, depending on whether the number of the character is three or more than three. For example, a sign of +1 is given to the characteristic vectors in a case of three characters and a sign of −1 is given to the characteristic vectors in a case of more three characters. In this way, three-character discriminant function can be obtained, which is provided with the characteristic vectors of all the samples as its input and provide the signs as its output. Thus the three-character discriminant function is obtained, which is composed of a regression curve and the sign of which varies between +1 and −1 depending on the input vector, in the same way as the case of one-character discriminant function shown in FIG. 5.

The n-character discriminant function can be obtained in the same way.

Figure 6:
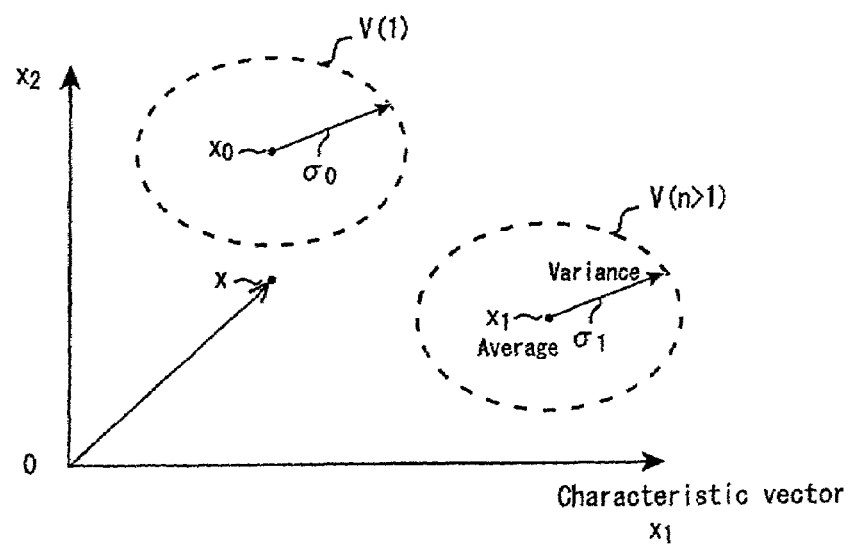
FIG. 6 is a drawing showing an example of another discriminant function of the number of characters according to the present invention.

FIG. 6 is a diagram explaining another embodiment of the discriminant function of the number of characters. A one-character discriminant function according to the embodiment is generated partly in the same way as described above. Namely, a large number of character image samples, in which one-character is filled in one-character frame F in the reading field and in which two or more characters are filled in one-character frame F are prepared. Assuming a distribution of characteristic vectors with respect to a group of one-character image samples and a distribution of characteristic vectors with respect to a group of plural-character image samples as normal distributions, an average and variance of the respective distributions are obtained beforehand. The distribution V(1) of a one-character characteristic vector group and the distribution V(n>1) of a plural-character characteristic vector group are indicated by circles of dashed lines in FIG. 6, which is a two-dimensional plane having an axis of abscissa of x1 and an axis of ordinate of x2, assuming that each character image sample is expressed by a two-dimensional characteristic vector. These groups are assumed to be approximated to the gauss distributions and they are respectively defined by mean value vectors $x_o$ and $x_1$ and covariances $\sigma_0$ and $\sigma_1$. With these distributions of sample groups being defined beforehand in the same way, it is decided to which an unknown characteristic vector x belong, thereby discriminating the number of characters.

More specifically, the distribution V(1) of the one-character group and the distribution V(n>1) of the plural-character group are assumed to be expressed by the first and the second Gauss distribution functions $G(x-x_o, \sigma_0)$ and $G(x-x_1, \sigma_1)$ respectively. Here, x indicates a characteristic vector. $x_o$ indicates a mean vector of one-character characteristic vectors. $\sigma_0$ indicates a covariance matrix of one-character characteristic vectors. $x_1$ indicates a mean vector of n-character (n>2) characteristic vectors. $\sigma_1$ indicates a covariance matrix of plural-character characteristic vectors. Being the unknown characteristic vector x is input, the one-character discriminant function compares the magnitudes of the function values by substitutes the characteristic vector x for the x in the first and the second Gauss distribution functions $G(x-x_o, \sigma_0)$ and $G(x-x_1, \sigma_1)$ respectively. The one-character discriminant function, thus decides that the input unknown characteristic vector belongs to the first or the second distribution whichever having a larger function value. In other words, the method described above means that the distances (mahalanobis distance) between the input characteristic vector x and each distribution V(1), V(n>1)shown in FIG. 6 is calculated and the unknown characteristic vector is decided to belong to the distribution, located at a shorter distance from the unknown characteristic vector.

Although FIG. 6 relates to the one-character discriminant function, the same method may be applied also to the discrimination using two-characters or more than 2. Namely, the first Gauss distribution function V(2) of a two-character group and the distribution function V(n>2) of a 3- or more-character group are obtained together with the first and second Gauss distribution functions $G(x-x_o, \sigma_0)$ and $G(x-x_1, \sigma_1)$. The input unknown characteristic vector x is substituted for these functions, and the function values thus calculated are compared mutually. Thus, it can be discriminated whether two-characters are filled or three or more characters are filled in the single character frame in the reading field.

As explained above, according to the present invention, the number of characters in the character frame of a form is decided. The characters are then separated and recognized based on the number decided, so that the characters can be recognized correctly even when two or more characters are filled in a single character frame. Further, the same characteristic vector as that used for recognition is used for decision of the number of characters, so that the number of the characters is decided with a high speed. There is no need to obtain the characteristic vector for recognition by using the same ones used for deciding the number of the characters. Thus overall process for the character recognition can be performed in a short time. Furthermore, high-speed decision of the number of characters filled in a frame is realized, since the decision of the number of characters is performed by simply incrementing the number of characters n sequentially from 1 to n, and by simply deciding whether the number of characters is n or not.

The present invention is not limited to the embodiments described and can be modified into or be exploited in various forms. For example, although the numeral is filled in the character frame in the above explanation, the present invention is not limited to it but any other characters such as Japanese characters including kana, kanji, characters used in foreign languages and any other symbols may be used.

Further, in the above embodiments, permutations of N and more than N number of characters are used as the character image samples for generating the n-character discriminant function. However, there is no need to use all sets of characters obtained by the permutations. For example, permutations of only (N+1) characters may be used, or smaller number of sets of characters extracted at random from all the sets of characters obtained by the permutations may be used for generating the n-character discriminant function.

More specifically, for preparation of the one-character discriminant function, there is no need to use all 100 sets of numerals composed of permutations of two-characters out of the 10 numerals from 0 to 9; 1,000 sets of numerals composed of permutations of 3 characters; and 10,000 sets of numerals composed of permutations of 4 characters. Instead, only the 100 sets of numerals composed of permutations of two-characters may be used. It may be possible to use the numeral sets extracted from the 100 sets optionally or at random, so that the number of characters can also be discriminated with necessary accuracy.

In the same way, for preparation of the two-character discriminant function, there is no need to use all of a hundred sets of numerals composed of permutations of two-characters out of the 10 numerals from 0 to 9, a thousand sets of numerals composed of permutations of three characters, and ten thousand sets of numerals composed of permutations of four characters. Instead, only the a hundred sets of numerals composed of permutations of two-characters and a thousand sets of numerals composed of permutations of three characters may be used. It is also possible to use the numeral sets extracted from these sets at random, so that the number of characters can also be discriminated with necessary accuracy.

What is claimed is:

1. A character recognition method for recognizing characters filled in a form having at least one character frame for filling a single character, comprising steps of:
    obtaining a characteristic vector of a character image in the character frame provided as an input signal;
    deciding the number of characters in one of the character frames using a discriminant function of the number of characters, wherein the discriminant function receives and discriminates using the characteristic vector extracted from the character image of the character frame and provides as an output a signal representing the number of characters contained in the frame;
    separating characters filled in the frame based on the output of the discriminant function; and
    recognizing the character thus separated using the characteristic vectors, obtained in the obtaining step, prepared for characters in a dictionary,
    wherein the discriminant function of the number of characters is a n-character discriminant function providing as its output a first function value for the input characteristic vectors each representing n (an integer not less than 1) number of characters filled in each character frame and providing as its output a second function value for the input characteristic vectors each representing other than n number of characters filled in the character frame.

2. A character recognition method according to claim 1, wherein the step of deciding the number of characters further comprises a one-character decision step of deciding whether a number of characters filled in each one of the character frames is 1 or more than 1.

3. A character recognition method according to claim 2, wherein the step of deciding the number of characters further comprises a two-character decision step of deciding whether the number of characters filled in each one of the character frames is two or more than two when the number of characters filled in each one of the character frames is decided as more than 1 by the one-character decision step.

4. A character recognition method according to claim 3, wherein the step of deciding the number of characters further comprises a three-character decision step of deciding whether the number of characters filled in each one of the character frames is three or more than three when the number of characters filled in each one of the character frames is decided as more than three by the two-character decision step, and
    wherein the step of deciding the number of characters increases sequentially the number of characters up to a predetermined upper limit number of characters, thereby repeating the steps of deciding the number of characters.

5. A character recognition method according to claim 2, wherein the one-character decision step further comprises:
    a step of obtaining a first distribution of characteristic vectors of a plurality of character images composed of one character filled in each one of the character frames;
    a step of obtaining a second distribution of characteristic vectors of a plurality of character images composed of two or more than two characters filled in each one of the character frames;
    a step of inputting the characteristic vectors of the character image, a number of characters of which is not known, filled in each one of the character frames; and
    a step of deciding whether the number of characters of the input characteristic vectors is one or not based on a distance between the input characteristic vectors and the first and second distribution of the characteristic vectors.

6. A character recognition method according to claim 3, wherein the two character decision step further comprises:
    a step of obtaining a first distribution of characteristic vectors of a plurality of character images composed of two characters filled in each one of the character frames;
    a step of obtaining a second distribution of characteristic vectors of a plurality of character images composed of three or more than three characters filled in each one of the character frames;
    a step of inputting the characteristic vectors of the character image, a number of characters of which is not known, filled in each one of the character frames; and
    a step of deciding whether the number of characters of the input characteristic vectors is two or not based on a distance between the input characteristic vectors and the first and second distribution of the characteristic vectors.

7. A character recognition device for recognizing characters filled in a form having at least one character frame for filling a single character, comprising:
    means for obtaining a characteristic vector of a character image in the character frame provided as an input signal;
    means for deciding a number of characters in one of the character frames using a discriminant function of the number of characters, wherein the discriminant function receives and discriminates using the characteristic vector extracted from the character image of the character frame and provides as an output a signal representing the number of characters contained in the frame;
    means for separating characters filled in the frame based on the output of the discriminant function; and means for recognizing the character thus separated using the characteristic vectors, obtained by the means for obtaining, prepared for characters in a dictionary, wherein the discriminant function of the number of characters is an n character discriminant function providing as its output a first function value for the input characteristic vectors each representing n (an integer not less than 1) number of characters filled in each character frame and providing as its output a second function value for the input characteristic vectors each representing other than n number of characters filled in the character frame.

8. A character recognition device according to claim 7, wherein the discriminant function of the number of characters includes a one character discriminant function providing the first function value for the input characteristic vectors each representing a single character filled in each character frame and providing the second function value for the input characteristic vectors representing plural characters filled in each character frame.

9. A character recognition device according to claim 8, wherein each of the input characteristic vectors representing a single character is extracted from each single character to be recognized by the means for recognizing the character and each of the input characteristic vectors representing plural characters is extracted from every combination of a plurality of characters to be recognized by the means for recognizing the character.

10. A character recognition device according to claim 7, wherein the discriminant function of the number of characters includes a two-character discriminant function providing the first function value for the input characteristic vectors each representing two characters filled in each character frame is two and providing the second function value for the input characteristic vectors each representing three or more characters filled in each character frame.

11. A character recognition device according to claim 10, wherein each of the input characteristic vectors representing two characters is extracted from every combination of any two characters to be recognized and each of the input characteristic vectors representing plural characters is extracted from every combination of any three or more characters to be recognized.

12. A character recognition device according to claim 9 or 11, wherein the characters are numerals of 0 to 9.

13. A character recognition device for recognizing characters filled in a form having at least one character frame for filling a single character, comprising:

means for obtaining a characteristic vector of a character image in the character frame provided as an input signal;

means for deciding a number of characters in the character frame, wherein the discriminant function receives and discriminates using the characteristic vector extracted from the character image of the character frame and provides as an output a signal representing the number of characters contained in the frame;

means for separating characters filled in the frame based on the output signal of the means for deciding the number of characters; and means for recognizing the character thus separated using the characteristic vectors, obtained by the means for obtaining, prepared for characters in a dictionary, wherein the deciding means further comprises means for obtaining a first distribution of characteristic vectors of a plurality of the character images, in which n (an integer not less than 1) number of characters are filled in the character frame, means for obtaining a second distribution of characteristic vectors of the character image, in which other than n number of characters are filled in the character frames, and means for deciding whether the number of characters of the characteristic vectors of the input character image is n or not based on a distance between the input characteristic vectors and the first and second distribution of the characteristic vectors.

14. A character recognition device according to claim 13, wherein the means for deciding the number of characters includes means for obtaining a first distribution of characteristic vectors of a plurality of character images composed of one character filled in the character frame and means for obtaining a second distribution of characteristic vectors of a plurality of character images composed of two or more characters filled in the character frame, and wherein the means for deciding whether the number of characters of the characteristic vectors of the input character image is one or not based on a distance between the input characteristic vectors and the first and second distribution of the characteristic vectors.

15. A character recognition device according to claim 13, wherein the means for deciding the number of characters includes means for obtaining a first distribution of characteristic vectors of a plurality of character images composed of two characters filled in the character frame and means for obtaining a second distribution of characteristic vectors of a plurality of character images composed of three or more characters filled in the character frame, and wherein the means for deciding whether the number of characters of the characteristic vectors of the input character image is two or not based on a distance between the input characteristic vectors and the first and second distribution of the characteristic vectors.

16. A character recognition device according to claim 14 or 15, wherein the characters are numerals of 0 to 9.

17. A computer program embodied in a computer-readable medium for performing the steps of:

obtaining a characteristic vector of a character image in the character frame provided as an input signal;

deciding the number of characters in one of the character frames using a discriminant function of the number of characters, wherein the discriminant function receives and discriminates using the characteristic vector extracted from the character image of the character frame and provides as an output a signal representing the number of characters contained in the frame;

separating characters filled in the frame based on the output of the discriminant function; and recognizing the character thus separated using the characteristic vectors, obtained in the obtaining step, prepared for characters in a dictionary, wherein the discriminant function of the number of characters is a n-character discriminant function providing as its output a first function value for the input characteristic vectors each representing n (an integer not less than 1) number of characters filled in each character frame and providing as its output a second function value for the input characteristic vectors each representing other than n number of characters filled in the character frame.

18. A computer program embodied in a computer-readable medium according to claim 17, wherein the step of deciding the number of characters in one of the character frames further comprises:

a step of obtaining a first distribution of characteristic vectors of a plurality of character images composed of one character filled in each one of the character frames;

a step of obtaining a second distribution of characteristic vectors of a plurality of character images composed of two or more than two characters filled in each one of the character frames; and a step of deciding whether the number of characters of the input characteristic vectors is one or not based on a distance between the input characteristic vectors and the first and second distribution of the characteristic vectors.

* * * * *